(12) United States Patent
Akama (10) Patent No.: US 10,134,140 B2
(45) Date of Patent: *Nov. 20, 2018

(54) MONITOR SYSTEM (71) Applicants: RAMROCK VIDEO TECHNOLOGY LABORATORY CO., LTD., Fukuoka-shi, Fukuoka (JP); Syusei Co., Ltd., Iizuka-shi, Fukuoka (JP)

(72) Inventor: Toshikazu Akama, Fukuoka (JP)

(73) Assignees: Ramrock Video Technology Laboratory Co., Ltd., Fukuoka-shi, Fukuoka (JP); Syusei Co., Ltd., Iizuka-shi, Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/867,194

(22) Filed: Jan. 10, 2018

(65) Prior Publication Data

US 2018/0130211 A1    May 10, 2018

Related U.S. Application Data

(63) Continuation of application No. 14/762,830, filed as application No. PCT/JP2013/051822 on Jan. 29, 2013, now Pat. No. 9,905,009.

(51) Int. Cl.
   *G06T 7/11*    (2017.01)
   *H04N 5/232*   (2006.01)
   *G06K 9/46*    (2006.01)
   *G08B 13/196*  (2006.01)
   *G06K 9/00*    (2006.01)
   (Continued)

(52) U.S. Cl.
   CPC ............ *G06T 7/11* (2017.01); *G06K 9/00362* (2013.01); *G06K 9/00771* (2013.01); *G06K 9/3241* (2013.01); *G06K 9/46* (2013.01); *G06T 7/73* (2017.01); *G08B 13/19652* (2013.01); *H04N 5/23229* (2013.01); *G06T 2207/10004* (2013.01); *G06T 2207/30232* (2013.01)

(58) Field of Classification Search
   CPC . G06T 7/0042; G06T 7/11; G06T 7/73; G06T 2207/10004; G06T 2207/30232; G06K 9/00362; G06K 9/00771; G06K 9/3241; G06K 9/46; G08B 14/19652; H04N 5/23229
   USPC ........................................................ 348/143
   See application file for complete search history.

(56) References Cited

U.S. PATENT DOCUMENTS 6,064,429 A * 5/2000 Belk ..................... G01N 21/94
                                                         348/128
6,323,898 B1 * 11/2001 Koyanagi ............. G01S 3/7864
                                                         348/169

(Continued)

*Primary Examiner* — William C Vaughn, Jr.
*Assistant Examiner* — Jae N Noh
(74) *Attorney, Agent, or Firm* — Amster, Rothstein & Ebenstein LLP (57) ABSTRACT

A surveillance system 1, which is an example of a surveillance system to which the present invention is applied, includes a surveillance region storage means 2 and an image analyzing means 3. Also, the surveillance system 1 includes an effective area information storage means 4 and an object criterion information storage means 5. A detection subject can be detected efficiently by setting a first step criterion of whether or not a portion of an object in an image is included in a range of a surveillance region and a predetermined second step criterion and determining whether or not these criteria are met.

14 Claims, 6 Drawing Sheets

(51) Int. Cl.
*G06K 9/32* (2006.01)
*G06T 7/73* (2017.01)

(56) References Cited

U.S. PATENT DOCUMENTS

| | | | | |
|---|---|---|---|---|
| 2007/0069920 A1* | 3/2007 | Hakki | ............... | G08G 1/0175 340/907 |
| 2011/0231419 A1* | 9/2011 | Papke | ............... | G06F 17/30793 707/756 |
| 2015/0254861 A1* | 9/2015 | Chornenky | ............ | G01C 15/00 348/135 |

* cited by examiner

MONITOR SYSTEM

This application is a Continuation of U.S. patent application Ser. No. 14/762,830, filed on Jul. 23, 2015 which is a National Stage Entry Under 35 U.S.C. 371 of International Patent Application No. PCT/JP2013/051822, filed on Jan. 29, 2013, the entire contents of each of which are incorporated by reference herein.

FIELD OF THE ART

The present invention relates to a surveillance system. Specifically, the present invention relates to a surveillance system capable of efficiently detecting a subject that is desired to be monitored from within an image.

BACKGROUND ART

Currently, surveillance systems are used in various applications, such as anti-crime measures, crime prevention measures, disaster measures, etc. A camera in a surveillance system may be installed at either an indoor or outdoor location and may be mounted inside a building, such as within station premises or within a store, etc., or on an outdoor gate or a portion of an outer wall.

Also, a surveillance system generally includes a camera that takes an image, a monitor that displays the taken image, and a notifying means that notifies, by means of an alarm or signal, that there is an emergency situation to a surveilling person when a suspicious person, etc., is detected.

There is also present a surveillance system that can be used without a surveilling person having to constantly check the image on a monitor. The surveillance system has an arrangement that makes a notification by an alarm, etc., only when a suspicious person is detected and can lighten the burden of the surveilling person and also reduce the manpower required for surveillance.

However, as a problem of the surveillance system having the arrangement to detect a suspicious person and notifying by an alarm, actuation of the alarm upon erroneous recognition of the subject to be detected can be cited. That is, even a guard or other person who is not desired to be detected is detected and the alarm is sounded. If actuation of the alarm occurs frequently, there arises the need for the surveilling person to check the image or the site each time. This is a burden to the surveilling person and the surveillance system cannot be said to be good in usability.

Given these circumstances, there is present a surveillance system, with which specific persons among the objects appearing in an image are eliminated from subjects of detection so that just a suspicious person is detected more readily. For example, a surveillance system has been proposed as described in Patent Document 1.

Figure 6:
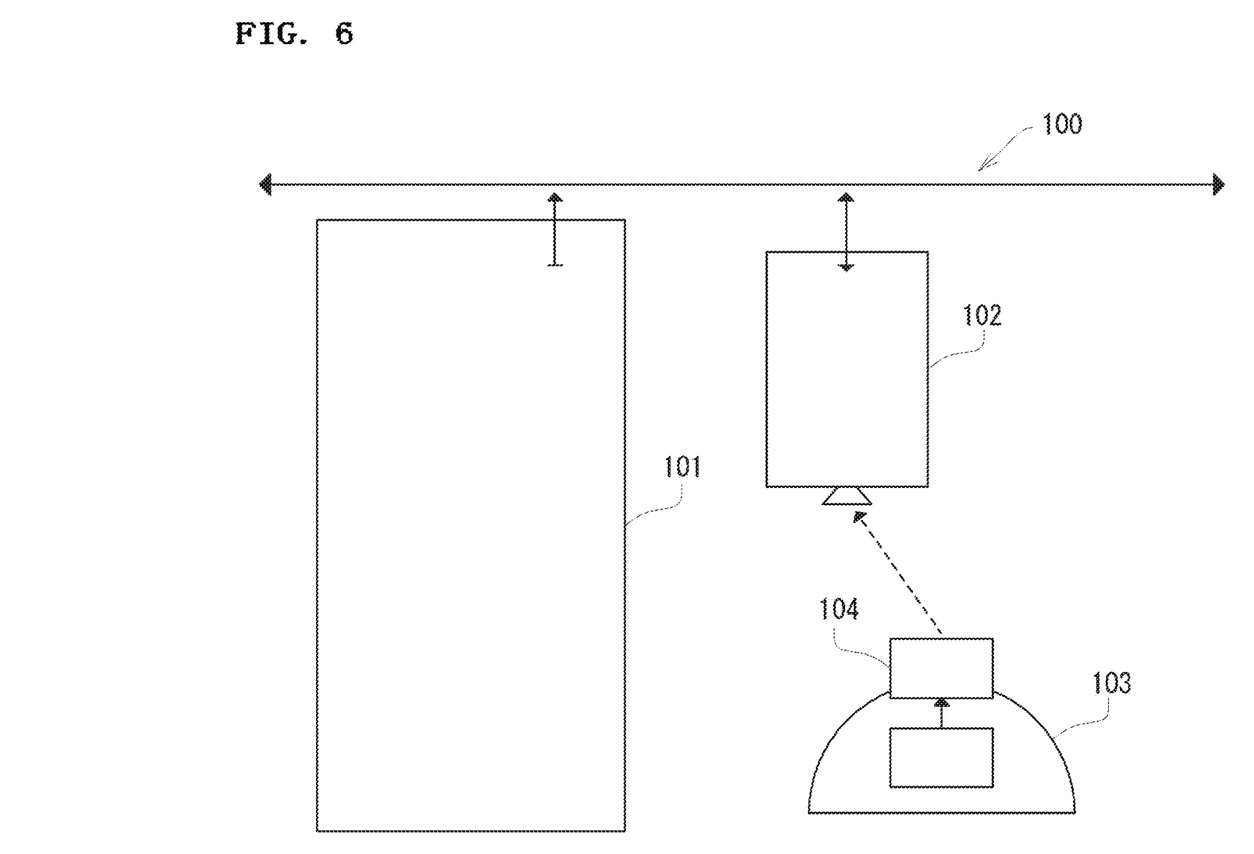
FIG. 6 is a schematic view of an example of a conventional surveillance system.

Here, a surveillance system 100, such as shown in FIG. 6, is described in Patent Document 1. The surveillance system 100 includes a surveillance controller 101, a surveillance camera 102, and a reporting exclusion signal outputting device 103 provided to a subject who is not to be detected. The reporting exclusion signal outputting device 103 performs flickering of a light source 104 in accordance with a reporting exclusion pattern and the surveillance controller 101 certifies a moving object with the light emission of the light source 104 as a person excluded from reporting.

PRIOR ART DOCUMENT

Patent Document

Patent Document 1: Japanese Published Unexamined Patent Application No. 2008-250898

SUMMARY OF THE INVENTION

Problem to be Solved by the Invention

However, with the surveillance system described in Patent Document 1, persons excluded from being detection subjects are limited to persons having the reporting exclusion signal outputting device. That is, the surveillance system may be said to be effective in a space limited to the coming and going of just specific persons. However, at a parking lot used by the general public or other location where the coming and going of persons besides the specific persons may be assumed, alarm actuation may occur frequently.

Also, in an outdoor environment where the flying of a bird or other animal may be assumed, alarm actuation due to such animals is expected to occur just as or more frequently as or than that due to humans. There are present systems that, as a countermeasure for animals, limit the surveillance subjects to humans by limiting the range for performing detection subject recognition in an image taking region or making an image judging means store the shape of a human to exclude animals.

However, with the method of limiting the range, there is a problem in that an entire image of a suspicious person cannot be imaged and a clear image cannot be acquired even though detection is possible. Also, in the case of limiting by shape to limit the detection subjects to humans, depending on light conditions and movement, a bird may appear like a human and be recognized as a human or a contour may be obscure so that the shape cannot be determined accurately.

The present invention has been made in view of the above points and an object thereof is to provide a surveillance system capable of efficiently detecting a subject that is desired to be monitored from within an image.

Means for Solving the Problem

To achieve the above object, a surveillance system according to the present invention includes a surveillance region storage means storing a surveillance region that is a partial region within an image pickup region, and an image analyzing means arranged to determine whether or not at least a portion of an object in an input image is located within the surveillance region stored in the surveillance region storage means and determine whether or not the object meets a predetermined condition if at least a portion of the object is determined to be located within the surveillance region.

Here, by having the surveillance region storage means that stores the surveillance region that is a partial region within the image pickup region, a specific range within the image pickup region can be stored as the surveillance region. Here, the image pickup region signifies the region desired to be surveilled as taken by a camera.

Also, by having the image analyzing means that determines whether or not at least a portion of an object in the input image is located within the surveillance region stored in the surveillance region storage means, it can be determined whether or not a portion of the object is located within the surveillance region. Here, if an object is not located within the surveillance region, the object is excluded from being a subject desired to be detected. That is, the determination of being or not being located within the surveillance region is a first step for specifying a detection subject. Also, detection efficiency can be improved by excluding an object that is not located within the surveillance region as unnecessary information.

Also, by having the image analyzing means that is arranged to determine whether or not an object meets the predetermined condition if at least a portion of the object is determined to be located within the surveillance region, it is possible to make just an object, a portion of which is located within the surveillance region, be subject to the determination of whether or not the object meets the predetermined condition. That is, the detection subject can be specified by subjecting an object, which has been subject to the determination of the first step of being positioned within the surveillance region, to the determination of a second step of meeting or not meeting the predetermined condition.

Also, by having the image analyzing means that is arranged to determine whether or not an object meets the predetermined condition if at least a portion of the object is determined to be located within the surveillance region, it is possible to specify the detection subject using two different regions subject to determination. That is, whereas determination is performed only within the surveillance region in the first step, determination is performed with an entire image of an object within the image pickup region. In the second step, the entire image, including a portion of the object located outside the surveillance region, can be checked to enable resolution of a problem of being able to check just an obscure shape within the surveillance region even if the object is detected.

Also, by having the image analyzing means that is arranged to determine whether or not at least a portion of an object in the input image is located within the surveillance region stored in the surveillance region storage means and determine whether or not the object meets the predetermined condition if at least a portion of the object is determined to be located within the surveillance region, the determination of whether or not an object is a detection subject can be made using the two determination criteria of the first step and the second step. Different criteria are set in the respective steps to enable improvement of detection efficiency. Also, as mentioned above, the regions subject to determination differ, with the interior of the surveillance region being used in the first step and the entire image of an object within the image pickup region being used in the second step, and the determination of being or not being a detection subject can be improved in accuracy. Also, only an object that is located within the surveillance region in the first step is subject to the determination of the second step so that unnecessary information is excluded in the first step to enable further improvement of detection efficiency.

Also, if an effective region storage means is provided that stores a region, which is a predetermined region within the image pickup region and at least partially overlaps with the surveillance region, as an effective region, a specific range within the image pickup region can be stored as an effective region. Here, "effective region" signifies a region in which just an object that fits within its range can be detected as a detection subject. On the other hand, an object that does not fit within the range of the effective region is excluded from being a detection subject.

Also, if the image analyzing means determines, as the predetermined condition, whether or not an object is included within the range of the effective range stored in the effective range storage means, the determination of the second step is performed based on the effective region. That is, if an object that has passed the determination of the first step is included within the range of the stored effective region, it can be specified as a detection subject. Also, by setting the effective region so that an object desired to be the detection subject fits therein, an object that is larger than the effective region can be eliminated from detection subjects and the determination of being or not being a detection subject can be improved in accuracy.

Also, if an object criterion information storage means storing at least one of either upper limit or lower limit information of a shape of an object as object criterion information is provided, the upper limit or lower limit of the shape of the object can be set and stored as the object criterion information.

Also, if the image analyzing means determines, as the predetermined condition, whether or not a shape of an object corresponds to being not less than the upper limit or not more than the lower limit of the object criterion information stored in the object criterion information storage means, the determination of the second step is performed based on the object criterion information. That is, if just the upper limit is set, whether or not the object is a detection subject can be specified by determining whether its shape is not less than the upper limit or less than the upper limit. Also, if just the lower limit is set, whether or not the object is a detection subject can be specified by determining whether its shape is not less than the lower limit or less than the lower limit. Also by setting both, being included or not being included in the range of the upper and lower limits can be made the criterion.

Also, if an image pickup region location time information storage means storing information on a time during which an object is located within the image pickup region as image pickup region location time information is provided, the time during which the object is located at the image pickup region can be stored.

Also, if the image analyzing means determines, as the predetermined condition, whether or not the image pickup region location time information stored in the image pickup region location time information storage means exceeds a predetermined time, the determination of the second step is performed based on the image pickup region location time information. That is, when it is desired to detect an object that is located within the image pickup region for a long time, an object with which the predetermined time is exceeded can be specified as a detection subject that meets the condition. Also, when it is desired to detect an object that is located within the image pickup region for only a short time, an object with which the predetermined time is not exceeded can be specified as a detection subject that meets the condition.

Also, if an acceleration information storage means storing information on an acceleration of an object when it moves inside the image pickup region as acceleration information is provided, the acceleration of the object within the image pickup region can be stored.

Also, if the image analyzing means determines, as the predetermined condition, whether or not the acceleration information stored in the acceleration information storage means exceeds a predetermined acceleration, the determination of the second step is performed based on the acceleration information. That is, when it is desired to detect an object that starts to move quickly within the image pickup region, an object with which the predetermined acceleration is exceeded can be specified as a detection subject that meets the condition. Also, when it is desired to detect an object that starts to move slowly within the image pickup region, an object with which the predetermined acceleration is not exceeded can be specified as a detection subject that meets the condition.

Also, if a color tone information storage means storing information on a color tone of an object as color tone information is provided, the color tone of the object can be stored.

Also, if the image analyzing means determines, as the predetermined condition, whether or not the color tone information stored in the color tone information storage means corresponds to a predetermined color tone, the determination of the second step is performed based on the color tone information. That is, when it is desired to detect just an object that has a specific color tone, an object having the specific color tone can be specified as a detection subject that meets the condition. Also, a plurality of color tones may be designated as conditions to allow the color tone to be within a certain range.

Also, if a luminance information storage means storing information on a luminance of an object as luminance information is provided, the brightness (luminance) of the object can be stored.

Also, if the image analyzing means determines, as the predetermined condition, whether or not the luminance information stored in the luminance information storage means corresponds to a predetermined luminance, the determination of the second step is performed based on the luminance information. That is, when it is desired to detect a bright object within the image pickup region, an object with which the predetermined luminance is exceeded can be specified as a detection subject that meets the condition. Also, when it is desired to detect a dark object within the image pickup region, an object with which the predetermined luminance is not exceeded can be specified as a detection subject that meets the condition.

Also, if an area occupancy information storage means storing information on an area occupancy of an object within the image pickup region as area occupancy information is provided, the proportion of area that the object occupies within the image pickup region can be stored.

Also, if the image analyzing means determines, as the predetermined condition, whether or not the area occupancy information stored in the area occupancy information storage means exceeds a predetermined area occupancy, the determination of the second step is performed based on the area occupancy information. That is, when it is desired to detect an object that takes up a large portion of the image pickup region, an object with which the predetermined area occupancy is exceeded can be specified as a detection subject that meets the condition. Also, when it is desired to detect an object that takes up a small portion of the image pickup region, an object with which the predetermined area occupancy is not exceeded can be specified as a detection subject that meets the condition.

Also, if a sound volume information storage means storing information on a volume of sound emitted by an object as sound volume information is provided, the volume of sound emitted by the object can be stored.

Also, if the image analyzing means determines, as the predetermined condition, whether or not the sound volume information stored in the sound volume information storage means exceeds a predetermined sound volume, the determination of the second step is performed based on the sound volume information. That is, when it is desired to detect an object that emits a loud sound, an object with which the predetermined sound volume is exceeded can be specified as a detection subject that meets the condition. Also, when it is desired to detect an object that emits a small sound or does not emit a sound, an object with which the predetermined sound volume is not exceeded can be specified as a detection subject that meets the condition.

Also, if a temperature information storage means storing information on a temperature of an object as temperature information is provided, the temperature of the object can be stored.

Also, if the image analyzing means determines, as the predetermined condition, whether or not the temperature information stored in the temperature information storage means exceeds a predetermined temperature, the determination of the second step is performed based on the temperature information. That is, when it is desired to detect an object of high temperature, an object with which the predetermined temperature is exceeded can be specified as a detection subject that meets the condition. Also, when it is desired to detect an object of low temperature, an object with which the predetermined temperature is not exceeded can be specified as a detection subject that meets the condition.

Also, if a humidity information storage means storing information on a humidity of an object as humidity information is provided, the humidity of the object can be stored.

Also, if the image analyzing means determines, as the predetermined condition, whether or not the humidity information stored in the humidity information storage means exceeds a predetermined humidity, the determination of the second step is performed based on the humidity information. That is, when it is desired to detect an object of high humidity, an object with which the predetermined humidity is exceeded can be specified as a detection subject that meets the condition. Also, when it is desired to detect an object of low humidity, an object with which the predetermined humidity is not exceeded can be specified as a detection subject that meets the condition.

Also, if an odor information storage means storing information on an odor of an object as odor information is provided, the odor of the object can be stored.

Also, if the image analyzing means determines, as the predetermined condition, whether or not the odor information stored in the odor information storage means corresponds to a predetermined odor or whether or not the odor information exceeds a predetermined odor intensity, the determination of the second step is performed based on the odor information. That is, when it is desired to detect an object that emits a strong odor, an object with which the predetermined odor intensity is exceeded can be specified as a detection subject that meets the condition. Also, when it is desired to detect an object that emits a weak odor, an object with which the predetermined odor intensity is not exceeded can be specified as a detection subject that meets the condition.

Also, if a notifying means that notifies the determination result of the image analyzing means is provided, a surveilling person can be notified by an alarm or signal, etc., when an object is specified as a detection subject.

Effect(s) of the Invention

The surveillance system according to the present invention is capable of efficiently detecting a subject desired to be surveilled from within an image.

MODE FOR CARRYING OUT THE INVENTION

Figure 1:
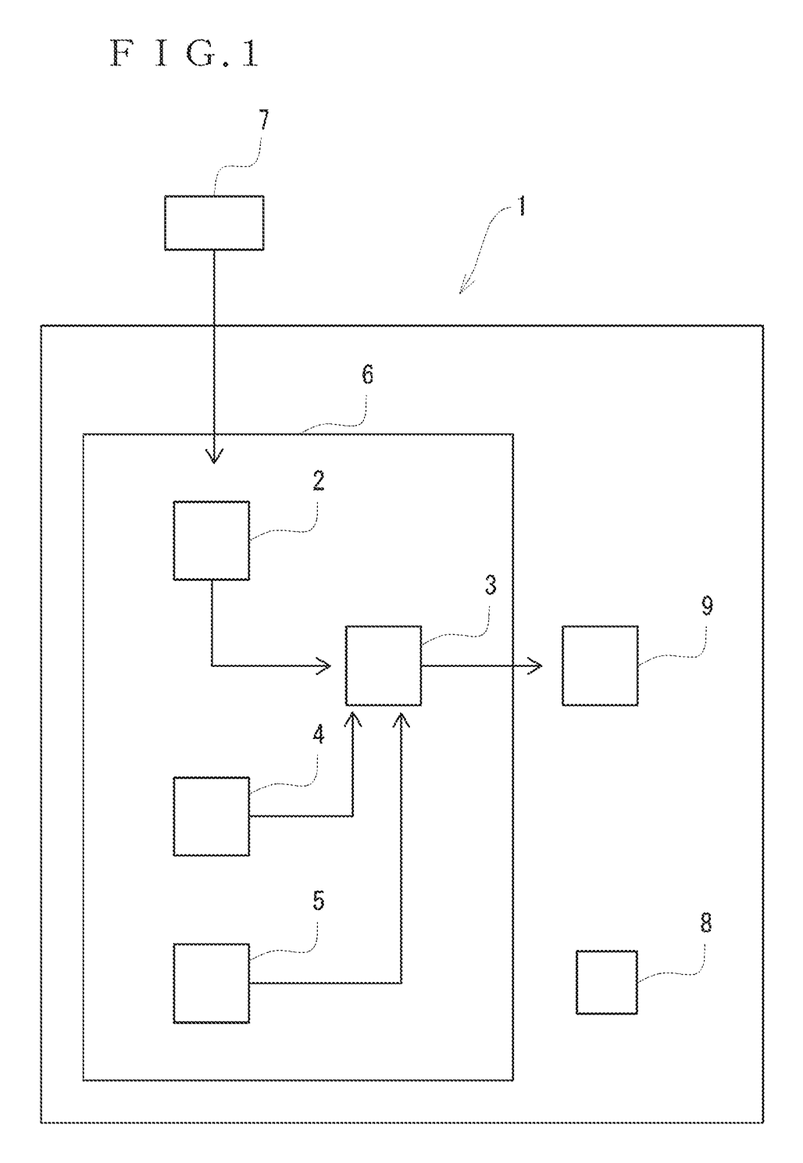
FIG. 1 is a schematic view of an example of a surveillance system to which the present invention is applied.
Figure 2:
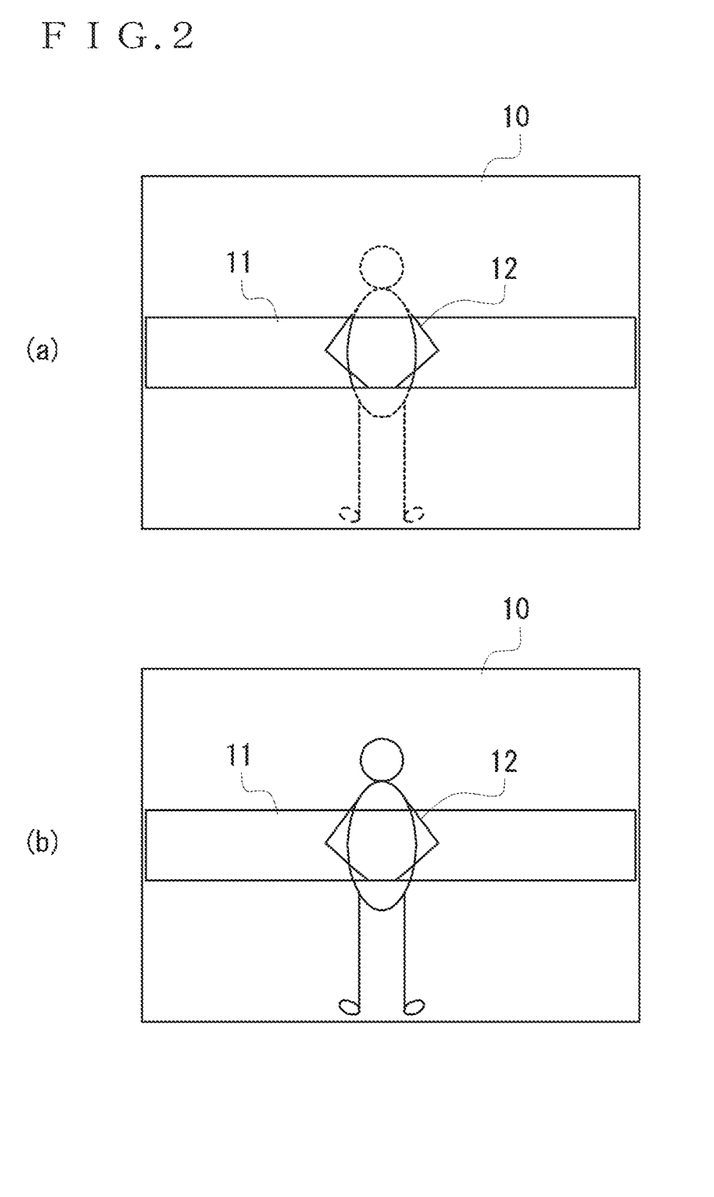
FIG. 2 shows schematic views (1) of an example of determination in accordance with a surveillance region.
Figure 3:
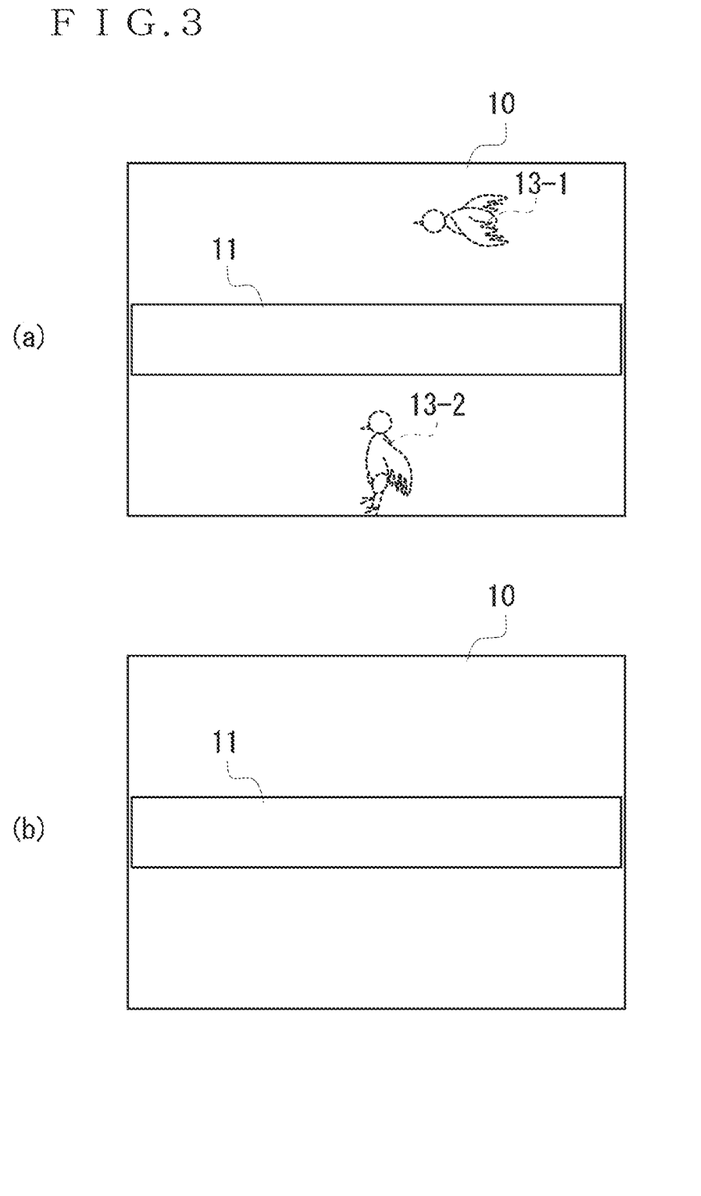
FIG. 3 shows schematic views (2) of an example of determination in accordance with a surveillance region.
Figure 4:
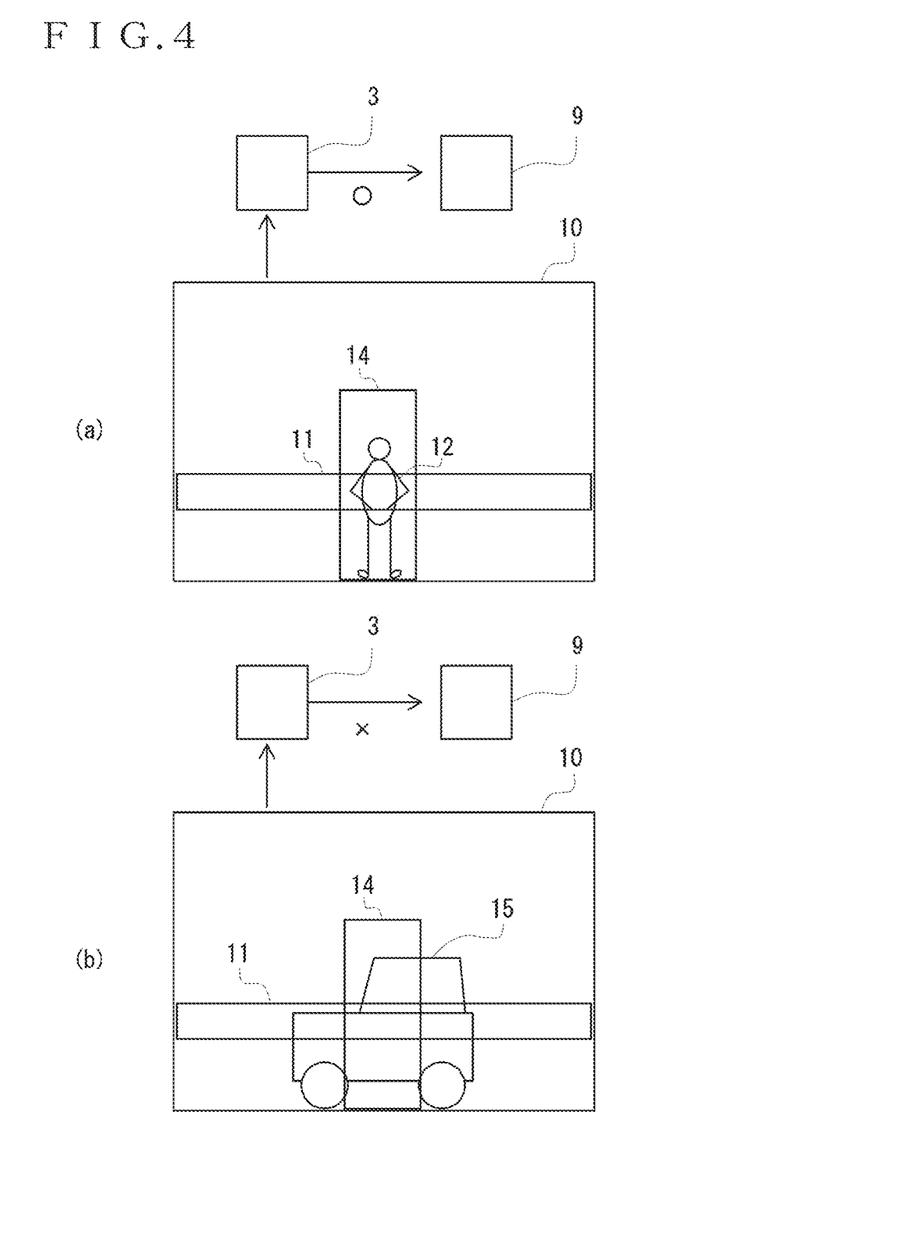
FIG. 4 shows schematic views of an example of determination in accordance with an effective region.
Figure 5:
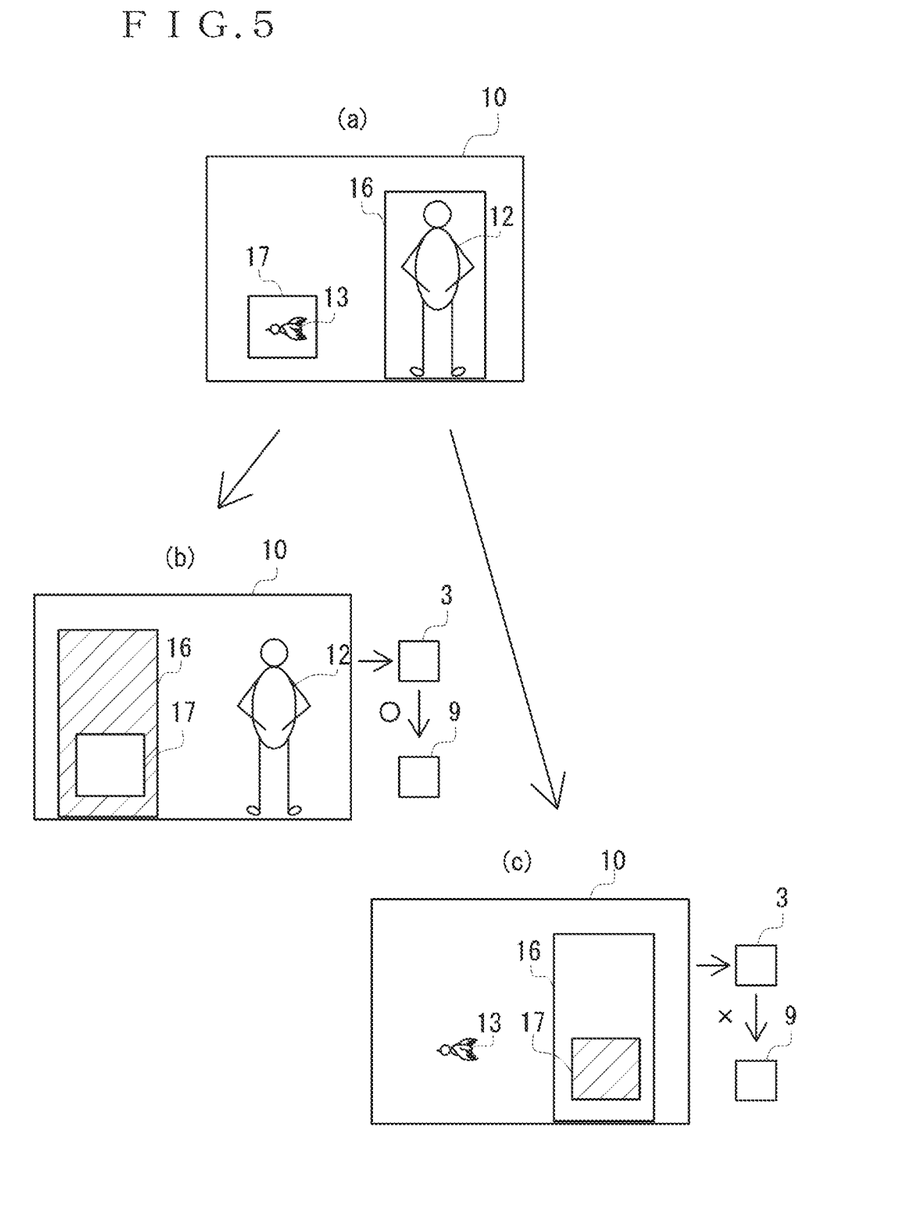
FIG. 5 shows schematic views of an example of determination in accordance with object criterion information.

An example of a surveillance system to which the present invention is applied shall now be described with reference to the drawings to aid in understanding the present invention. FIG. 1 is a schematic view of the example of the surveillance system to which the present invention is applied. FIG. 2 shows schematic views (1) of an example of determination in accordance with a surveillance region. FIG. 3 shows schematic views (2) of an example of determination in accordance with a surveillance region. FIG. 4 shows schematic views of an example of determination in accordance with an effective region. FIG. 5 shows schematic views of an example of determination in accordance with object criterion information.

As shown in FIG. 1, the surveillance system 1, which is an example of the surveillance system to which the present invention is applied, includes a surveillance region storage means 2 and an image analyzing means 3.

The surveillance region storage means 2 stores a surveillance region 11, which is a partial region within an image pickup region 10 that is taken by a camera 7. The surveillance region 11 is set by selecting a location or a range within the image pickup region 10 at or in which a detection subject tends to be included. Also, the image analyzing means 3 analyzes an image and determines whether or not an object within the image pickup region meets conditions of a first step and a second step. If an object meets both conditions, the image analyzing means 3 specifies the object as a detection subject.

In the first step condition, a criterion is whether or not an object within the image pickup region is included at least partially within the range of the surveillance region 11. Also, in the second step condition, a criterion is any of various parameters, such as the size, shape, time of being located, humidity, etc., of the object. The second step condition that is suited for detection may be selected in accordance with the detection subject. Also, a plurality of conditions may be combined to improve the accuracy of detection.

The surveillance system 1 also includes an effective area information storage means 4 (an example of an effective region information storage means) storing an effective area that is a criterion in the second step condition and an object criterion information storage means 5 storing object criterion information that is similarly a criterion in the second step condition.

The effective area 14 signifies a region in which just an object that is included within its range is detected as a detection subject. On the other hand, an object that extends outside the effective area 14 is excluded from being a detection subject. Also, the surveillance region 11 and the effective area 14 are set with shapes having regions that overlap at least partially. This is because if the surveillance region 11 and the effective area 14 do not overlap at all, there will be no object that can meet the conditions of both and this is meaningless for the surveillance system.

Also, the object criterion information storage means 5 can be made to set and store an upper limit and a lower limit of a shape of an object as object criterion information. By setting upper and lower limits for a size or shape of a detection subject in advance, whether or not the set conditions are met can be determined to specify the detection subject.

Here, it is not necessarily required to set the surveillance region 11 as the first step condition, and a specific region within the image pickup region may be set as a non-surveillance region. By setting the non-surveillance region, a region besides it is made the surveillance region 11. For example, by setting a specific region of an aerial portion, in which a bird tends to be taken, as the non-surveillance region, it becomes easy to exclude a bird from being a detection subject.

The surveillance system 1 is not necessarily required to include the effective area information storage means 4. However, it is preferable for the surveillance system 1 to include the effective area information storage means 4 because by setting the effective area, an object that does not fit within the range of the effective area can be excluded from being a detection subject and detection of a specific detection subject is made easy. If the surveillance system 1 does not include the effective area information storage means 4, at least one second step condition, such as the object criterion information, must be set.

Also, the surveillance system 1 is not necessarily required to include the object criterion information storage means 5. However, it is preferable for the surveillance system 1 to include the object criterion information storage means 5 because by setting the upper limit and the lower limit of the shape of an object as detection conditions, detection of just an object having a specific size or shape is made easy. If the surveillance system 1 does not include the object criterion information storage means 4, at least one condition, such as the effective area information, must be set for the second step condition.

Also, the second step condition is not limited to the criteria stored in the effective area information storage means 4 and the object criterion information storage means 5. Any of the various parameters described below may be used as a criterion in accordance with characteristics of a detection subject.

Also, although a detection subject is specified in the two stages of the first step and the second step here, this is merely one example. That is, a surveillance system may be arranged where a third and further steps are added for determination by the image analyzing means 3. For example, if a determination is made with the effective area as the condition in the second step and the condition is met, specifying as a detection subject can be performed using the object criterion information as the criterion in the third step.

Also, the surveillance region storage means 2, the image analyzing means 3, the effective area information storage means 4, and the object criterion information storage means 5 are installed as software programs on a computer 6.

Also, the surveillance system 1 includes the camera 7 arranged to take an image and a monitor 8 arranged to display the image taken by the camera. Also, the surveillance system 1 includes a notifying means 9 that notifies the determination result of the image analyzing means. By using, for example, a communication system applying the internet as the notifying means 9, it becomes possible to notify circumstances to a surveilling person at a remote location. Also, by using an acoustic means applying a speaker, etc., the circumstances can be notified to the surveilling person by use of sound. Further, by using a light emitting means applying a lamp, etc., the circumstances can be notified to the surveilling person by use of lighting of the lamp.

Here, the surveillance system 1 is not necessarily required to include the monitor 8 and the surveillance system 1 is not necessarily required to display by means of an image as long as it can detect an intruder, etc. However, it is preferable for the surveillance system 1 to include the monitor 8 because an object within the image pickup region can be checked by the image and because the effective area and the object criterion information can be set readily.

Also, the surveillance system 1 is not necessarily required to include the notifying means 9. However, it is preferable for the surveillance system 1 to include the notifying means 9 because the surveilling person can know in real time that an object meeting the conditions of a detection subject is present within the region that is imaged.

Operations of the surveillance system 1 arranged as described above shall now be described with reference to the drawings.

First, the determination regarding the condition of the first step of performing determination regarding the surveillance region shall be described.

FIG. 2 shows diagrams of setting the surveillance region 11 in the first step. Here, the surveillance region 11 is set as a region such that a trunk portion of an intruder 12 to be a detection subject is included within the range of the surveillance region 11. The set surveillance region 11 is stored in the surveillance region storage means 2. The surveillance region 11 may be set freely as long as it is a portion of the image pickup region 10.

Also, the surveillance region 11 may be set while checking the image by using the monitor 8 that displays the image of the camera 7 and a mouse (not shown). The method for setting the surveillance region 11 is not limited to that using the monitor 8 and the mouse and any method by which the surveillance region 11 can be set may be used. Or, a non-surveillance region may be set to specify the surveillance region 11.

The condition of the first step for the determination of corresponding or not corresponding to a detection subject is the condition of whether or not a portion of an intruder is included in the surveillance region 11. If as shown in FIG. 2(*a*), the intruder 12 is included even partially within the range of the surveillance region 11, the image analyzing means 3 enters the subsequent second step of performing determination regarding the second condition. In FIG. 2(*a*), the portion of an entire image of the intruder 12 drawn by solid lines that are included within the range of the surveillance region 11 is the portion subject to detection. The portions not included within the range of the surveillance region 11 are indicated by dotted lines and are excluded from being a subject of detection.

In FIG. 2 (*a*), a trunk portion of the intruder 12 is included within the range of the surveillance region 11 and therefore the image analyzing means 3 determines that the first step condition is met. The second step is then entered. As shown in FIG. 2 (*b*), the entire image of the intruder 12, including the portions besides that in the surveillance region 11, is subject to the determination regarding the second step condition and therefore unlike in FIG. 2 (*a*), the entire image of the intruder 12 is indicated by solid lines.

On the other hand, if an object (for example, a bird 13) is present inside the image pickup region 10 but is not included even partially within the range of the surveillance region 11, the object is excluded from being a detection subject and the determination regarding the second step condition is not performed.

FIG. 3 (*a*) shows a case where birds 13 are not included in the surveillance region 11. When either of the birds 13 is flying in the sky (13-1) or is located near the ground (13-2), not even a portion of either of the birds 13 is included within the range of the surveillance region 11. Both birds 13-1 and 13-2 are not included within the range of the surveillance region 11 and are therefore indicated by dotted lines here. Consequently, the birds 13 do not meet the first step condition and the image analyzing means 3 excludes the birds 13 from being detection subjects. As shown in FIG. 3(*b*), the birds 13 are not subject to the determination in the second step and are handled as not being present in the image pickup region 10. That is, the birds 13, which are not present even partially in the surveillance region 11, can be excluded from being detection subjects to enable improvement of detection efficiency.

A case of performing determination using the effective area as the second step condition shall now be described.

An image in which the effective area 14 is set is shown in FIG. 4. Here, it shall be assumed in the following description that the second step is entered with the intruder 12 in the image already being determined as being included within the range of the surveillance region 11 in the first step.

As with the surveillance region 11, the effective area 14 may be set while checking the image by using the monitor 8 and the mouse. A specific range, in the range of which the detection subject is expected to fit, is set as the effective area 14 and stored in the effective area information storage means 4. Here, the effective area 14 is set based on a size, in the range of which the intruder 12 fits, and a location, through which the intruder 12 is expected to pass.

Also in the second step, the entire image of the object inside the image pickup region is subject to the conditional determination. That is, with the determination regarding the surveillance region 11, which is the first step condition, just a portion of the object suffices to be present inside the surveillance region and the condition is met even if another portion is located in a region besides the surveillance region 11. In the second step, whether or not the second step condition is met is determined with the image pickup region and the entire image of the object including the portion located outside the surveillance region 11.

A case where the object fits within the range of the effective area 14 is shown in FIG. 4(*a*). The intruder 12 fits within the range of the set effective area 14 and by the image analyzing means 3, the intruder 12 is determined as meeting the second criterion and is specified as a detection subject. The result of determination by the image analyzing means 3 may be transmitted through a communication line, etc., to the notifying means 9 and the presence of the detection subject may be notified to a surveilling person by an alarm using sound or a lamp.

A case where the object does not fit within the range of the effective area 14 is shown in FIG. 4 (*b*). An automobile 15 is larger than the intruder 12 and does not fit within the range of the set effective area 14 but extends outside the range. In this case, in the determination regarding the second step condition, it is determined that the automobile 15 does not meet the condition and is excluded from being a detection subject. Also similarly, in a case where the object is present only outside the range of the effective area 14, the criterion of the second step condition is not met and the object is excluded from being a detection subject. If the image analyzing means 3 determines that the criterion of the second step condition is not met, the notifying means 9 is not actuated.

Also, a case of performing determination using object criterion information as the second step condition shall now be described.

An image with which an upper limit and a lower limit of the intruder 12 are set as the object criterion information is shown in FIG. 5. Here, it shall be assumed in the following description that the second step has been entered with the intruder 12 and the bird 13 in the image already being determined as being included within the range of the surveillance region 11 in the first step.

First, as in the setting of the surveillance region 11, the setting of the object criterion information may be performed while checking the image by using the monitor 8 and the mouse. The range of the upper and lower limits that is in accordance with the size and shape of a detection subject is set as the object criterion information and stored in the object criterion information storage means 5.

The intruder 12 as an object that is desired to be a detection subject and the bird 13 as an object that is desired not to be a detection subject are shown in FIG. 5(*a*). As the upper limit (set, for example, as a large rectangle 16), a range slightly larger than the intruder 12 is set. As the lower limit (set, for example, as a small rectangle 17), a range smaller than the large rectangle and slightly larger than the bird 13 is set. An object smaller than the large rectangle 16 and larger than the small rectangle 17 is determined to be a detection subject. The rectangles are but an example of the shapes used for setting the range of the upper and lower limits, and the shapes that determine the range are not limited to rectangles.

A case where the intruder 12 is present within the image pickup region and meets the second step condition is shown in FIG. 5(*b*). The intruder 12 is an object that is smaller than the large rectangle 16 and larger than the small rectangle 17 and is included within the range of the set upper and lower limits and therefore the image analyzing means 3 specifies the intruder 12 as a detection subject. The result of determination by the image analyzing means 3 may be transmitted through a communication line, etc., to the notifying means 9 and the presence of the detection subject may be notified to a surveilling person by an alarm using sound or a lamp.

A case where only the bird 13 is present in the image and the second step condition is not met is shown in FIG. 5(*c*). The bird 13 is an object that is smaller than the small rectangle 17 and is less than the set lower limit. In this case, in the determination regarding the second step condition, it is determined that the bird 13 does not meet the condition and is excluded from being a detection subject. Here, the bird 13 is indicated by dotted lines in FIG. 5(*c*) because it is not within the range of the upper and lower limits. Also with the present condition, an object larger than the large rectangle 16 similarly does not meet the criterion of the second step condition and is excluded from being a detection subject. If the image analyzing means 3 determines that the criterion of the second step condition is not met, the notifying means 9 is not actuated.

Although in the example of FIG. 5, being within the range of the upper and lower limits is the criterion of the second step condition, the condition setting is not limited thereto. The criterion may be set with just an upper limit or just a lower limit of the shape of an object. The condition may be changed in accordance with the size and shape of a subject desired to be detected.

The size and shape of an object differ according to a location at which the camera 7 is installed and to the broadness and depth dimension of the range taken. Specifically, if a region that is large in the depth dimension is taken, an object located at a front side of the image pickup region and an object that is located at an inner side differ significantly in size and shape. In such a case, a plurality of combinations of upper and lower limits may be set to determine that the second step condition is met when any of the conditions is met.

Also, although cases of setting the effective area and the object criterion information as the second step condition were described individually, the two may be combined as the second step condition. When the conditions are combined, the accuracy of detection can be improved more than when each condition is set singly.

In the description up to now, the surveillance system 1 in the cases where the effective area and the object criterion information are used as the second step condition was described. Criteria that can be set as the second step condition shall now be described as other embodiments.

First, as another embodiment 1, the surveillance system 1 that includes an image pickup region location time information storage means shall be described. Image pickup region location time information refers to a time during which an object is located within the image pickup region 10, and the image analyzing means 3 determines whether or not the second step condition is met in regard to the image pickup region location time information.

When it is desired to detect an object that is located within the image pickup region for a long time, setting is performed so that the second step condition is met if a predetermined time is exceeded. For example, if it is desired to detect a harmful animal that stays in a cultivation field for some time and damages crops, the harmful animal can be detected by setting a time slightly shorter than the time during which it stays in the cultivation field.

Also, when it is desired to detect an object that is located within the image pickup region for only a short time, setting is performed so that the second step condition is met if the predetermined time is not exceeded. For example, if it is desired to detect a vehicle that enters and exits an entrance/exit of a parking lot with a parking lot ticket machine installed, a time shorter than an average time of time until exit after a vehicle stops near the machine is set to enable detection of a vehicle that enters and exits.

Also, as another embodiment 2, the surveillance system 1 that includes an acceleration information storage means shall be described. Acceleration information refers to an acceleration of an object when it moves inside the image pickup region and the image analyzing means 3 determines whether or not the second step condition is met in regard to the acceleration information.

When it is desired to detect an object that starts to move quickly within the image pickup region, setting is performed so that the second step condition is met if a predetermined acceleration is exceeded. For example, if, as a countermeasure against cash register burglary at a convenience store, it is desired to detect a burglar that leaves the store quickly, an acceleration slightly lower than an acceleration at which a human being starts to move quickly is set as a criterion. An object that starts to move more quickly than this acceleration can be detected as a burglar or a suspicious person.

Also, when it is desired to detect an object that starts to move slowly within the image pickup region, setting is performed so that the second step condition is met if the predetermined acceleration is not exceeded. For example, if it is desired to observe a behavior of a slow-moving animal, an acceleration slightly higher than the movement of the animal that is to be the subject is set as a criterion. An animal that moves more slowly than the set acceleration can be detected as an observation subject.

Also, as another embodiment 3, the surveillance system 1 that includes a color tone information storage means shall be described. Color tone information refers to a color tone of an object and the image analyzing means 3 determines whether or not the second step condition is met in regard to the color tone information.

When it is desired to detect an object that has a specific color tone within the image pickup region, setting is performed so that the second step condition is met if an object has a specific color tone. For example, if it is desired to detect just a red-colored automobile, a red color tone is set as a criterion to enable detection of just a red-colored vehicle.

Also, as another embodiment 4, the surveillance system 1 that includes a luminance information storage means shall be described. Luminance information refers to a brightness of an object and the image analyzing means 3 determines whether or not the second step condition is met in regard to the luminance information.

When it is desired to detect a bright object within the image pickup region, setting is performed so that the second step condition is met if a predetermined luminance is exceeded. For example, if it is desired to detect a vehicle that passes through road with which passage during nighttime is prohibited, a luminance slightly lower than a brightness of a vehicle's lights is set as a criterion. When a vehicle passes with its lights on, it can be detected as an object having a brightness that exceeds the luminance of the criterion.

Also, when it is desired to detect a dark object within the image pickup region, setting is performed so that the second step condition is met if the predetermined luminance is not exceeded. For example, if it is desired to detect a bicycle with its light off, a luminance slightly lower than a brightness of a bicycle's light is set as a criterion. When a bicycle passes with its light off, it can be detected as an object with which the luminance of the criterion is not exceeded.

Also, as another embodiment 5, the surveillance system 1 that includes an area occupancy information storage means shall be described. Area occupancy information refers to a proportion of area that an object occupies within the image pickup region and the image analyzing means 3 determines whether or not the second step condition is met in regard to the area occupancy information.

When it is desired to detect an object that takes up a large portion of the image pickup region, setting is performed so that the second step condition is met if a predetermined area occupancy is exceeded. For example, if, in an image pickup area with a depth dimension, just an object that passes close to a location at which the camera is installed is desired to be detected, a value slightly less than an area occupancy of an object that passes close by is set as a criterion. An object that passes close by occupies a large area in the image pickup region and can be detected because it exceeds the area occupancy of the criterion.

Also, when it is desired to detect an object that takes up a small portion of the image pickup region, setting is performed so that the second step condition is met if the predetermined area occupancy is not exceeded. For example, if, in opposition to the above case, just an object that passes far from the location at which the camera is installed is desired to be detected in the image pickup region with the depth dimension, a value slightly greater than an area of occupancy of an object that passes far away is set as a criterion. An object that passes far away occupies a small area in the image pickup region and can be detected because it does not exceed the area occupancy of the criterion.

Also, as another embodiment 6, the surveillance system 1 that includes a sound volume information storage means shall now be described. Sound volume information refers to information on a volume of sound emitted by an object and the image analyzing means 3 determines whether or not the second step condition is met in regard to the sound information.

When it is desired to detect an object that emits a loud sound, setting is performed so that the second step condition is met if a predetermined sound volume is exceeded. For example, a sound information condition may be used to sense abnormality of a manufacturing line of a precision machine with which human access is difficult. If a loud sound is not emitted during normal operation but a driving sound becomes loud in an abnormality, a sound volume that is slightly less than the driving sound in an abnormality is set as a criterion. When an abnormality occurs in the manufacturing line and the driving sound becomes loud, the abnormality can be detected without a surveilling person having to go close to the manufacturing line.

Also, when it is desired to detect an object that emits a small sound or does not emit a sound, setting is performed so that the second step condition is met if the predetermined sound volume is not exceeded. For example, if starting of an electric automobile of quiet sound is to be detected, a sound slightly louder than a starting sound is used as a criterion. When the electric automobile starts, it can be detected because it is an object that emits a smaller sound than the sound of the criterion.

Also, as another embodiment 7, the surveillance system 1 that includes a temperature information storage means may be considered. Temperature information refers to information on a temperature of an object and the image analyzing means 3 determines whether or not the second step condition is met in regard to the temperature information.

When it is desired to detect an object of high temperature, setting is performed so that the second step condition is met when a predetermined temperature is exceeded. For example, if it is desired to detect an arson on a garbage dump, a temperature slightly lower than the temperature by a lighter or other heat source is set as a criterion. When a lighter or other heat source is present, it can be detected because the temperature of the criterion is exceeded.

Also, when it is desired to detect an object of low temperature, setting is performed so that the second step condition is met when the predetermined temperature is not exceeded. For example, if it is desired to detect an abnormality of dropping temperature in a plastic greenhouse, in which temperature is controlled to grow crops, a temperature of a lower limit of a temperature zone suited for crop growth is set as a criterion. Falling of temperature below the temperature of the criterion due to a climate condition or a temperature control problem can be detected.

Also, as another embodiment 8, the surveillance system 1 that includes a humidity information storage means may be considered. Humidity information refers to information on a humidity of an object and the image analyzing means 3 determines whether or not the second step condition is met in regard to the humidity information.

When it is desired to detect an object of high humidity, setting is performed so that the second step condition is met when a predetermined humidity is exceeded. For example, in an exhibition room of a museum, which is desired to be kept at not more than a certain humidity, the predetermined humidity is set as a criterion. When dew condensation occurs on glass for exhibition and the humidity exceeds the predetermined criterion due to an air conditioning setting or climate, this can be detected.

Also, as another embodiment 9, the surveillance system 1 that includes an odor information storage means may be considered. Odor information refers to information on an odor of an object and the image analyzing means 3 determines whether or not the second step condition is met in regard to the odor information.

When it is desired to detect an object that emits a strong odor, setting is performed so that the second step condition is met when an odor intensity exceeds a predetermined intensity. For example, if in a storage chamber for a chemical substance that is volatile and emits an odor harmful to the human body, it is desired to detect leakage of the chemical substance, an odor intensity when the chemical substance volatilizes is set as a criterion. If due to some reason, the chemical substance leaks and the odor intensity of the criterion is exceeded, this can be detected.

As described above, with the surveillance system to which the present invention is applied, a detection subject can be detected efficiently by setting the first criterion of whether or not a portion of an object in an image is included in the range of the surveillance region and the predetermined second criterion and determining whether or not these criteria are met.

Also, with the first step condition, an object that is not included within the range of the surveillance region is excluded from being a detection subject. Unnecessary information can thus be eliminated and therefore alarm actuation caused by a bird or other small animal can be lessened.

Also, with the second step condition, the effective area information, for detecting an object included within a specific range, and the object criterion information, by which the range of the upper and lower limits of an object is set according to the size and shape of the object, can be set. A targeted objected can be detected efficiently by setting a range and size suited for a detection subject.

Also, with the second step condition, a condition can be set using various parameters that an object has, such as the time of being located in the image pickup region, the acceleration, the color tone, the luminance, etc. A criterion can be set up to enable detection of an object according to a condition suited to characteristics of a detection subject without dependence on just the shape of an object.

Further, an object meeting the first step condition regarding the surveillance region is subject to the second step determination using the entire image of the object included in the image pickup region. The entire image of a detection subject can thereby be clarified in comparison to a surveillance system with which a range to be surveilled is simply limited.

Also, even in a case where the shape cannot be ascertained clearly due to light conditions, movement of the object, or manner of appearance in the image, the accuracy of detection can be made high by determination by the second step condition.

The surveillance system to which the present invention is applied is thus arranged to be capable of efficiently detecting a subject desired to be monitored from within an image.

DESCRIPTION OF THE SYMBOLS

1 Surveillance system
2 Surveillance region storage means
3 Image analyzing means
4 Effective area information storage means
5 Object criterion information storage means
6 Computer
7 Camera
8 Monitor
9 Notifying means
10 Image pickup region
11 Surveillance region
12 Intruder
13 Bird
14 Effective area
15 Automobile
16 Large rectangle
17 Small rectangle

What is claimed is:

1. A method for a computing apparatus of surveilling an image pickup region of an image pickup apparatus, comprising:
   storing, in a storage memory, a surveillance region that is a predetermined partial region within the image pickup region and a fixed effective region, which is another predetermined partial region that is fixed within the image pickup region, the fixed effective region at least partially overlapping with the surveillance region;
   receiving, at the computing apparatus, an input image from the image pickup apparatus and monitoring the surveillance region of the input image to determine whether or not at least a portion of an object in the input image is located within the surveillance region;
   determining, when at least a portion of the object is determined to be located within the surveillance region based on the monitoring, whether or not the object is contained within the fixed effective region; and
   generating, by the computing apparatus, a surveillance event indication when the object is determined to be contained within the fixed effective region based on the determining.

2. The method of claim 1, wherein the input image is a moving image.

3. The method of claim 1, wherein the fixed effective region comprises a portion that is not overlapped with the surveillance region.

4. The method of claim 1, further comprising:
   storing at least one of either upper limit or lower limit information of a shape of the object as object criterion information; and
   determining whether or not the shape of the object corresponds to being not less than the upper limit or not more than the lower limit of the stored object criterion information, wherein
   the surveillance event indication generating is further conditioned upon one of a positive result and a negative result of the shape determining.

5. The method of claim 4, further comprising:
   storing information on a time during which the object is located within the image pickup region as image pickup region location time information;
   determining whether or not the stored image pickup region location time information exceeds a predetermined time, wherein the surveillance event indication generating is further conditioned upon one of a positive result and a negative result of the time determining.

6. The method of claim 1, further comprising:

storing information on an acceleration of the object when it moves inside the image pickup region as acceleration information;

determining whether or not the stored acceleration information exceeds a predetermined acceleration, wherein the surveillance event indication generating is further conditioned upon one of a positive result and a negative result of the acceleration determining.

7. The method of claim 1, further comprising:

storing information on a color tone of the object as color tone information;

determining whether or not the stored color tone information corresponds to a predetermined color tone, wherein the surveillance event indication generating is further conditioned upon one of a positive result and a negative result of the color tone determining.

8. The method of claim 1, further comprising the steps of:

storing information on a luminance of the object as luminance information;

determining whether or not the stored luminance information corresponds to a predetermined luminance, wherein the surveillance event indication generating is further conditioned upon one of a positive result and a negative result of the luminance determining.

9. The method of claim 1, further comprising the steps of:

storing information on an area occupancy of the object within the image pickup region as area occupancy information;

determining whether or not the stored area occupancy information exceeds a predetermined area occupancy, wherein the surveillance event indication generating is further conditioned upon one of a positive result and a negative result of the occupancy determining.

10. The method of claim 1, further comprising the steps of:

storing information on a volume of sound emitted by the object as sound volume information;

determining whether or not the stored sound volume information exceeds a predetermined sound volume, wherein the surveillance event indication generating is further conditioned upon one of a positive result and a negative result of the sound volume determining.

11. The method of claim 1, further comprising the steps of:

storing information on a temperature of the object as temperature information;

determining whether or not the stored temperature information exceeds a predetermined temperature, wherein the surveillance event indication generating is further conditioned upon one of a positive result and a negative result of the temperature determining.

12. The method of claim 1, further comprising the steps of:

storing information on a humidity of the object as humidity information;

determining whether or not the stored humidity information exceeds a predetermined humidity, wherein the surveillance event indication generating is further conditioned upon one of a positive result and a negative result of the humidity determining.

13. The method of claim 1, further comprising the steps of:

storing information on an odor of the object as odor information;

determining whether or not the stored odor information corresponds to a predetermined odor or whether or not the odor information exceeds a predetermined odor intensity, wherein the surveillance event indication generating is further conditioned upon one of a positive result and a negative result of the odor determining.

14. The method of claim 1, further comprising:

notifying the surveillance event indication to a surveilling person.

* * * * *